(No Model.) 7 Sheets—Sheet 1.

J. SNELLING.
ROTARY ENGINE.

No. 479,080. Patented July 19, 1892.

Witnesses
Albert Read.
Frederick Peek.

Inventor.
Jeffrey Snelling.

(No Model.)  J. SNELLING.  7 Sheets—Sheet 3.
ROTARY ENGINE.

No. 479,080.  Patented July 19, 1892.

Witnesses.
Albert Read.
Frederick Peck.

Inventor.
Jeffrey Snelling.

(No Model.) 7 Sheets—Sheet 4.
J. SNELLING.
ROTARY ENGINE.
No. 479,080. Patented July 19, 1892.
FIG. 4. 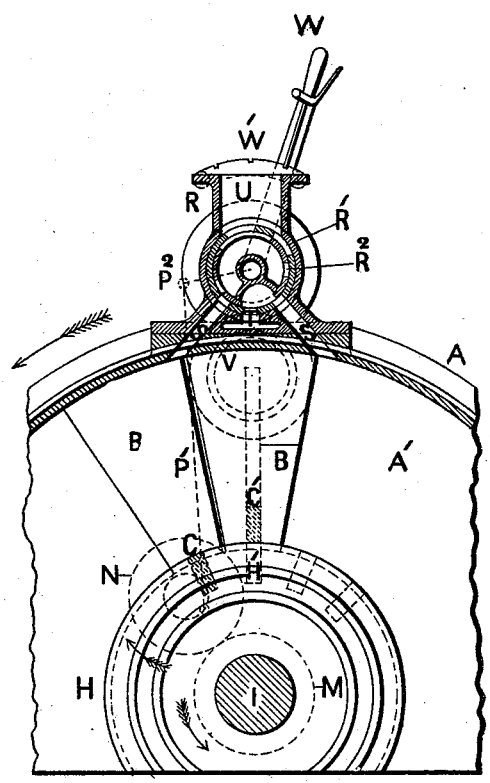 FIG. 4$^a$. 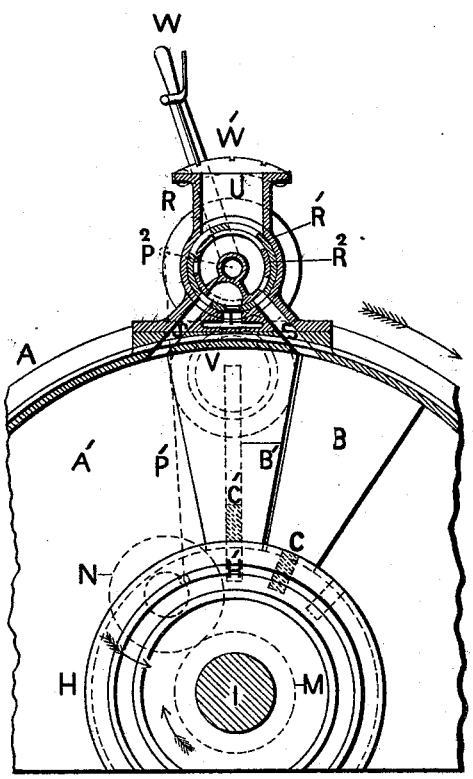
FIG. 5$^a$. FIG. 5. 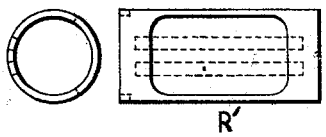 FIG. 6$^a$. FIG. 6. 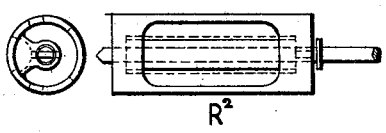
Witnesses
Albert Read
Frederick Peck
Inventor
Jeffrey Snelling (No Model.)  J. SNELLING.  7 Sheets—Sheet 5.
ROTARY ENGINE.
No. 479,080.  Patented July 19, 1892.
FIG. 7.  FIG. 8.  FIG. 9.
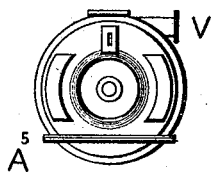 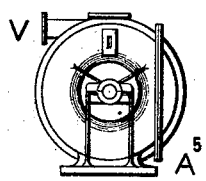 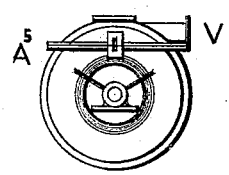
FIG. 7$^a$.  FIG. 8$^a$.  FIG. 9$^a$.
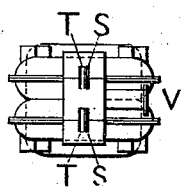 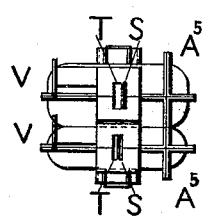 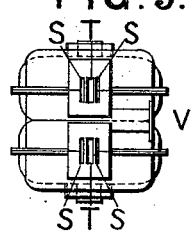
FIG. 10.  FIG. 11.
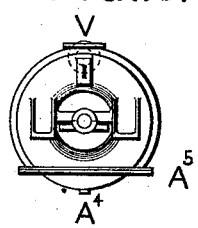 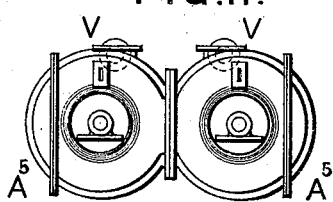
FIG. 10$^a$.  FIG. 11$^a$.
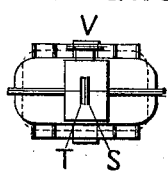 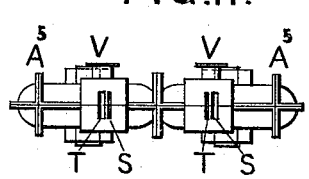
Witnesses  
Albert Read  
Frederick Peck.
Inventor  
Jeffrey Snelling
THE NORRIS PETERS CO., PHOTO-LITHO., WASHINGTON, D. C.

(No Model.) 7 Sheets—Sheet 6.

J. SNELLING.
ROTARY ENGINE.

No. 479,080. Patented July 19, 1892.

Witnesses
Albert Read
Frederick Peck

Inventor
Jeffrey Snelling (No Model.)  7 Sheets—Sheet 7.

J. SNELLING.
ROTARY ENGINE.

No. 479,080. Patented July 19, 1892.

Witnesses.
Albert Read.
Frederick Peck.

Inventor
Jeffrey Snelling.

UNITED STATES PATENT OFFICE.

JEFFREY SNELLING, OF EAST GREENWICH, ENGLAND.

ROTARY ENGINE.

SPECIFICATION forming part of Letters Patent No. 479,080, dated July 19, 1892.

Application filed October 9, 1890. Serial No. 367,622. (No model.) Patented in England December 24, 1889, No. 20,703.

*To all whom it may concern:*

Be it known that I, JEFFREY SNELLING, a subject of the Queen of Great Britain, residing at 25 Annandale Road, East Greenwich, in the county of London, England, have invented a new and useful Rotary Engine to Work with Steam, Air, Gas, and other Fluids, (for which I have obtained Letters Patent in Great Britain, No. 20,703, bearing date December 24, 1889,) of which the following is a specification.

My invention relates to improvements in rotary engines to work with steam, air, gas, and other fluids. These rotary engines may be made either simple, compound, or other expansion, reversing, non-reversing, condensing or non-condensing. I attain these objects by the mechanism illustrated in the accompanying drawings, in which—

Figure 1:
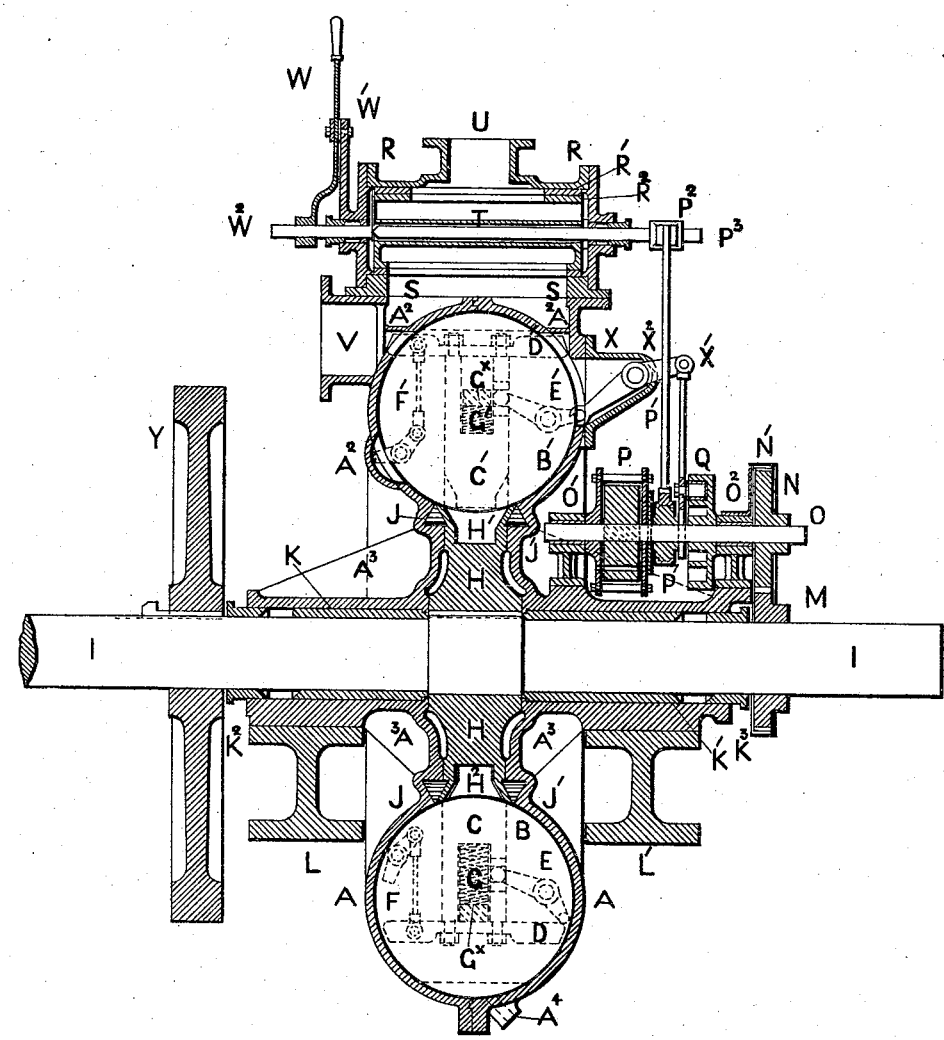
Figure 2:
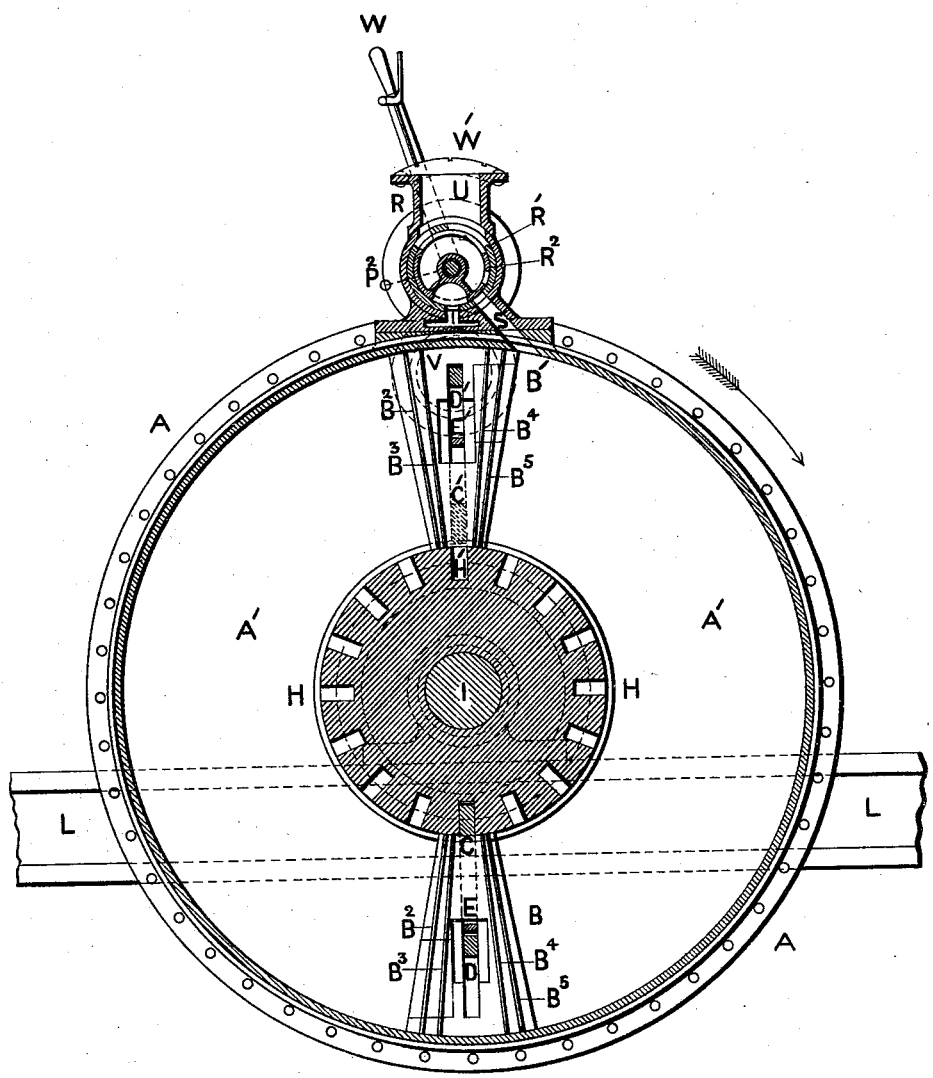
Figure 3:
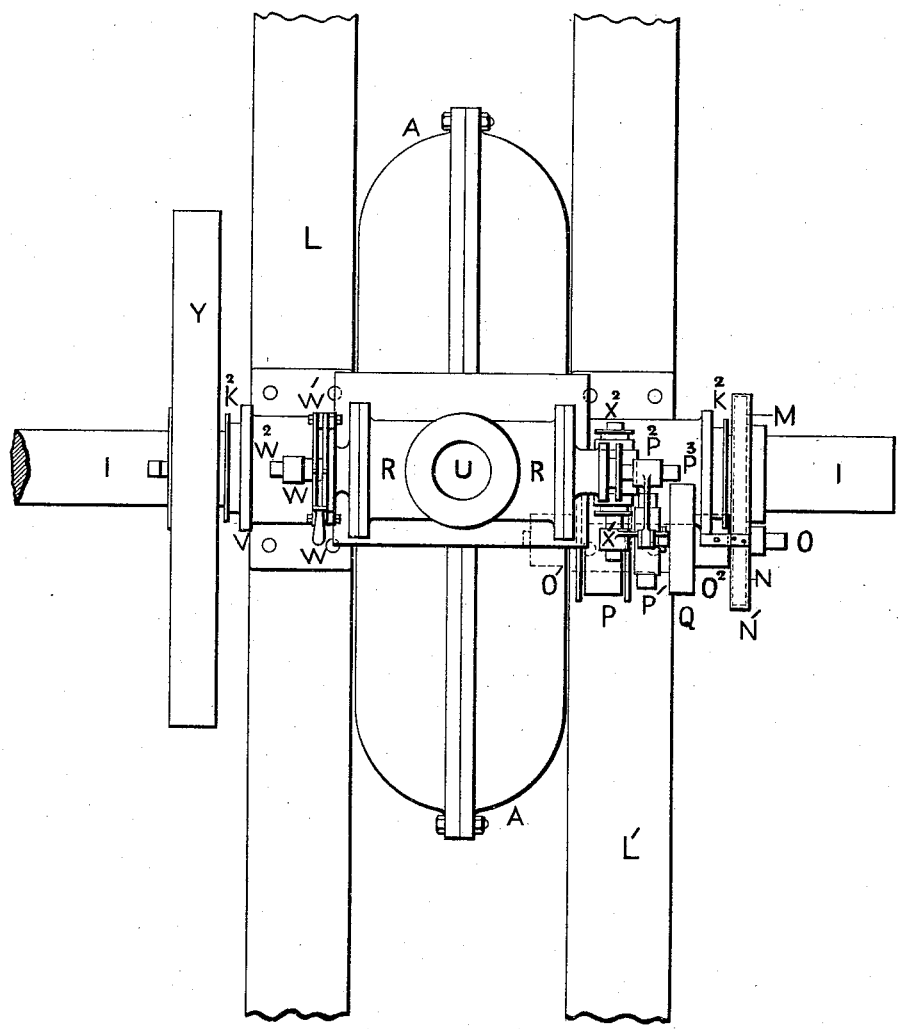
Figure 12:
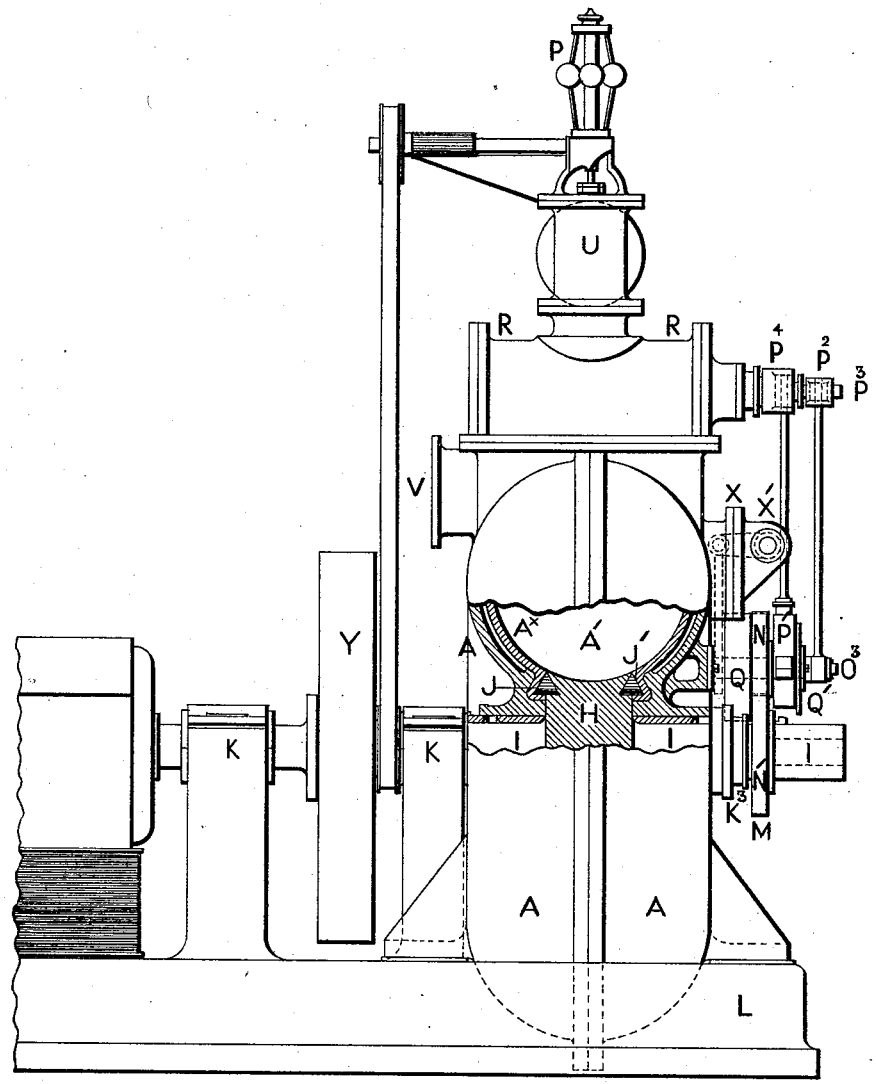
Figure 13:
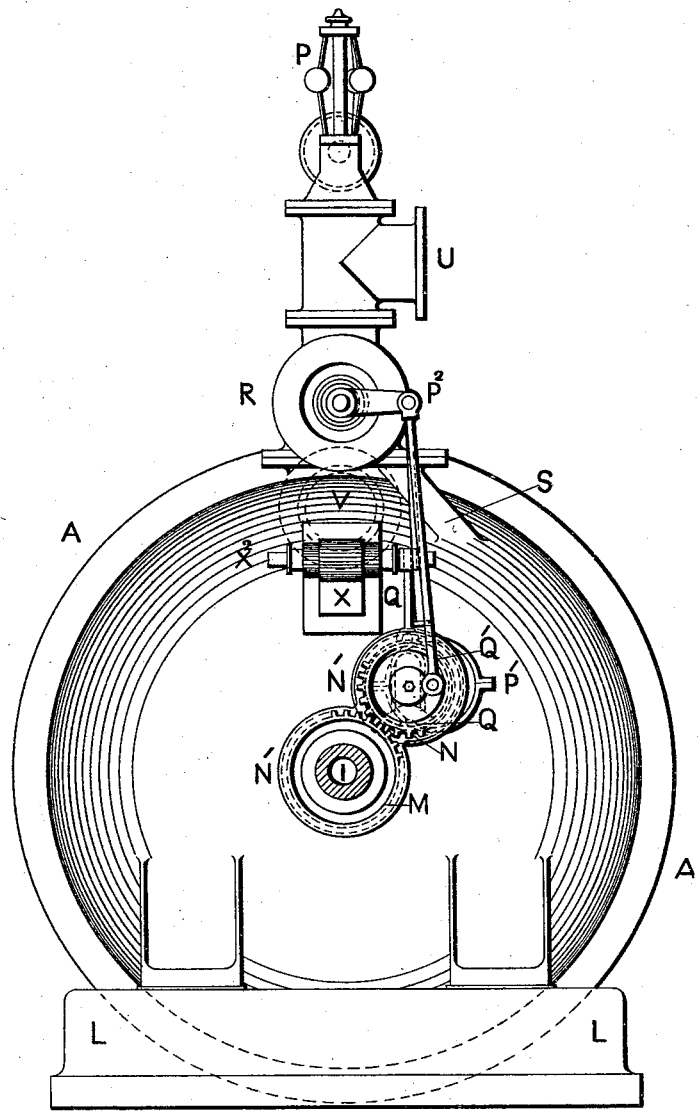

Figure 1 is a vertical section of the entire engine. Fig. 2 is a transverse vertical section. Fig. 3 is a plan view. Figs. 4 and $4^a$ illustrate the positions of the pistons and valves for reversing. Fig. 5 is an elevation of the reversing or expansion valve. Fig. $5^a$ is an end elevation of Fig. 5. Fig. 6 is an elevation of the inlet-valve. Fig. $6^a$ is an end elevation of Fig. 6. Fig. 7 is an elevation of two cylindrical casings with both annular cavities of circular form. Fig. $7^a$ is a plan of Fig. 7. Fig. 8 is an elevation of two cylindrical casings, one with annular cavity of oval form and the other of circular form. Fig. $8^a$ is a plan of Fig. 8. Fig. 9 is an elevation of two cylindrical casings with both annular cavities of oval form. Fig. $9^a$ is a plan of Fig. 9. Fig. 10 is an elevation of one cylindrical casing with annular cavity of oval form. Fig. $10^a$ is a plan of Fig. 10. Fig. 11 is an elevation of two cylindrical casings with annular cavities of circular form and bolted together for the piston-wheel shafts to revolve parallel to each other. Fig. $11^a$ is a plan of Fig. 11. Fig. 12 is an elevation, partly in section and arranged with steel lining fitted within the annular cavity of the cylindrical casing, with the piston wheel and shaft formed together and a hole through the shaft, but otherwise similar to Fig. 1. Fig. 13 is a transverse elevation of Fig. 12.

In Figs. 1, 2, and 3, A is the cylindrical casing, with projection and recess formed upon the inside faces for retaining each half central with each other. The sides are extended, so as to form a space for the bearings, bushes, glands, and packing around the piston-wheel shaft I. A' is the annular cavity formed within the cylindrical casing A. $A^2$ are the recesses formed within the annular cavity to receive the bars of the sliding bolts. $A^3$ are the strengthening-ribs, and $A^4$ the drain-boss, of the cylindrical casing A. The cylindrical casing A is also extended through the conical spring-rings, with a face upon it to meet a similar face upon the piston-wheel. These faces assist in retaining the piston-wheel in its central position in the cylindrical casing A and prevent undue wear of the conical faces through side movement of the piston-wheel. Within the annular cavity of the cylindrical casing A two pistons B and B' are fitted, and each piston is provided with four or more grooves, into which are fitted piston-rings $B^2$, $B^3$, $B^4$, and $B^5$. These are so arranged in the pistons that, the internal fittings being in the center, the rings prevent the steam, air, gas, and other fluids having access to the fittings, and also preventing leakage past the periphery of the piston-wheel and partition-piston. C and C' are the sliding bolts fitted in the pistons B and B'. The bars D and D' are fitted onto the sliding bolts C and C'. E and E' are the releasing-levers; F and F', the connecting-rods. The spiral springs G and G' retain the fittings in their proper position within the pistons B and B' by acting against the stop $G^\times$. The pistons B and B' are provided with covers to retain the fittings within them, and are also cored to lighten them. The piston-wheel H is keyed upon the piston-wheel shaft I, and its periphery forms a portion of the annular cavity of the cylindrical casing A. Upon the sides of the piston-wheel H are formed conical faces to correspond with similar conical faces formed upon the cylindrical casing A. H' and $H^2$ are recesses formed in the piston-wheel H to receive the ends (which should be well rounded) of the sliding bolts C and C'. J and J' are the conical spring-rings, of solid or channeled section, with tongue pieces fitted into them and fitted with studs for revolving with the piston-wheel H. K and K' are the main bearings, and $K^2$ and $K^3$ are the glands, for the piston-wheel shaft I. The girders L and L′ form a bed for the cylindrical casing A. The wheel M is keyed on the piston-wheel shaft I and is geared into the wheel N, keyed on the valve and releasing-gear shaft O. N′ is a guard fitted over the wheels M and N to prevent anything falling into them. O′ and $O^2$ are the bearings provided for the shaft O. The governor P is of the "Turner-Hartnell" automatic expansion type, and in being coupled to the eccentric and rod P′ the stroke of the eccentric and travel of the valve $R^2$ may be reduced when the engine is running above its normal number of revolutions. The valve-lever $P^2$ and valve-spindle $P^3$ are actuated by the governor P and eccentric P′. Q is the box-cam and rod fitted with a roller working upon a curved path within the box-cam Q. These are fitted upon the shaft O for actuating the releasing-lever X′. R is the valve-casing, of circular form, provided with a flange to bolt it onto the face on the cylindrical casing A. In the base of the valve-casing R the inlet-port S and eduction-port T are formed to correspond with those in the cylindrical casing A. Within the circular portion of the valve-casing R is fitted the reversing or expansion valve R′, which is retained in position by the lever W and spindle $W^2$, and within the reversing or expansion valve R′ is fitted the inlet-valve $R^2$, which is actuated by the eccentric and rod P′. The valve-casing R is provided with covers and glands in them to receive the valve-spindles. The interior of the valve-casing R is bored conical to allow the reversing or expansion valve R′ fitting upon its seat without leakage and for convenience of adjusting the valve through wear. Upon one of the covers of the valve-casing R a sector W′ is fitted to receive the lever W for the purpose of regulating the supply of steam, air, gas, and other fluids to the cylindrical casing A. $W^2$ is the spindle for the reversing or expansion valve R′. U is the supply-pipe, and V is the eduction-pipe. X is the hood for the releasing-lever X′ and is provided with a flange to bolt onto the face formed upon the cylindrical casing A to receive it. The releasing-lever X′ is fitted within this hood X and has a shaft $X^2$ and glands fitted to it to enable the releasing-lever X′ to work without leakage from the cylindrical casing A. Y is the fly-wheel upon the piston-wheel shaft I.

In Figs. 4 and $4^a$ is shown the arrangement of the reversing or expansion valve R′, the inlet-valve $R^2$, the inlet-ports S and S′, the eduction-port T, and the reversing-lever W, for a reversing rotary engine, in which the reversing-lever W is shown in position for forward and backward movements of the pistons, the direction of which is indicated by the arrows on the outside of the cylindrical casing A. In this arrangement of my invention as a reversing rotary engine the reversing or expansion valve R′ may assume three positions—viz., either forward, backward, or mid position—with intermediate positions of the valve for working expansively. When the reversing-lever W is placed in the forward position, the reversing or expansion valve R′ is moved so that one of its inlet-ports is placed in communication with the inlet-port of the cylindrical casing A for that direction of movement, and when the reversing-lever W is placed in the backward position the reversing or expansion valve R′ is moved so that the port in the reversing or expansion valve R′ that has been acting as an eduction-port for the forward direction of motion is now used as an inlet-port and is in communication with the backward port in the cylindrical casing A, and that port in the reversing or expansion valve R′ which was used as an inlet-port for the forward direction of motion is now used as an eduction-port. By placing the reversing-lever W in its central position both ports of the reversing or expansion valve R′ are covered and no communication with the inlet-ports in the cylindrical casing A can be obtained.

In Figs. 5, $5^a$, 6, and $6^a$ the supply and inlet ports of the reversing or expansion valve R′ are shown; also, the supply, inlet, and exhaust ports of the inlet-valve $R^2$. The supply-ports of these valves should be of such dimensions that the valves may be relieved of a certain amount of pressure upon their seats.

Figs. 7, $7^a$, 8, $8^a$, 9, $9^a$, 10, $10^a$, 11, and $11^a$ illustrate the different forms and arrangements of the cylindrical casings when used as compound or other expansion; also, the positions of the removable cover $A^5$.

The main bearings in Figs. 10 and $10^a$ are adjustable.

Figs. 12 and 13 illustrate an arrangement of my invention for an expansion rotary engine in which the piston-wheel shaft I is coupled to the armature-spindle of a dynamo. The cylindrical casing A is provided with a steel lining for high speed. The space between the steel lining $A^×$ and the cylindrical casing A may be utilized as a jacket. The piston-wheel shaft I is provided with a hole through it for water-service and has an extra bearing K upon the bed-plate L. The governor P is of the "Pickering" type and is placed upon the supply-pipe U and driven by a belt from the piston-wheel shaft I. The inlet-valve $R^2$ is operated by the crank-disk Q′ and the expansion-valve R′ by an eccentric P′. In this arrangement the box-cam Q and the eccentric P′, with the wheel N, are all keyed upon a bush fitted to revolve upon a stud $O^3$ and are driven from the wheel M on the piston-wheel shaft I, gearing into the wheel N, as in Fig. 1.

The lubrication of main bearings, piston-wheel, and conical spring-rings is done from the chamber of the cylindrical casing A, inclosing the piston-wheel H, in addition to that obtained from the lubricators fitted to the main bearings. The lubrication of the internal fittings of the pistons is effected during the period of rest, when the pistons are retained in their position as a partition. When two or more cylindrical casings are coupled together, the pistons may then be arranged to be either opposite each other or at right angles during each revolution of the piston-wheel shaft. The direction of motion is shown by the arrow. It is assumed that the piston B is just commencing a revolution, as shown in Fig. 4, and, the inlet-valve R² being set correctly for the required lead, the admission commences and, acting upon the piston B, causes it to revolve in connection with the piston-wheel H. The piston B, having reached that part of the revolution where it is desired to cut off the inlet-valve R² is closed and the remaining portion of the revolution is completed by the expansion of the steam. This continues until, reaching a given point of the revolution, the exhaust-port T of the valve R² is then opened to the port in the cylindrical casing A and exhaust takes place into the eduction-pipe V. The piston B now having reached that part of its revolution approaching the partition-piston B' and leaving only the necessary clearance between the piston B and the partition-piston B' to avoid their touching each other the box-cam Q then actuates the releasing-lever X' and liberates the bar D and levers E in the partition-piston B', which have been retained in the recesses A² of the cylindrical casing A, at the same time advancing the sliding bolt C into the recess H², directly opposite to it in the piston-wheel H, and as the partition-piston B' moves forward from its position, the piston B still continuing its revolution until the end of the releasing-lever X' passes down the clearance and engages with the lever E in the piston B to disconnect the sliding bolt C from the recess H' in the piston-wheel H, at the same time placing the bar D and levers E of the piston B into the same recesses A² in the cylindrical casing A vacated by the partition-piston B', thus making the piston B a partition, while piston B' is revolving. The valve R' may be set to suit the load.

From the foregoing it will be understood that the pistons B and B' must assume one of two positions—viz., either connected to the piston-wheel H as a revolving piston or disconnected from the piston-wheel H and held in position as a partition—for the sliding bolt C is unable to get out of its recess in the piston-wheel H, owing to the bar D in the piston B having no clearance for lifting during a revolution until opposite the recesses A² in the cylindrical casing A. The direction of motion of the box-cam Q, eccentric P', and crank-disk Q' is just the reverse to that of the revolving piston. The wheel M upon the piston-wheel shaft I has a greater number of teeth in it than the wheel N, into which it gears, and the number of teeth in these wheels is governed by the number of recesses in the piston-wheel H, and these will vary in number according to circumstances, depending upon the thickness and clearance of the pistons. This difference in the number of teeth in the wheels M and N for actuating the inlet-valve and releasing-lever rods is due to the inlet-valve R² and releasing-lever X' being required to act as much quicker in advance of the revolving piston equal to the distance between two recesses in the piston-wheel or the amount of space and clearance of one piston. This allows the partition-piston to be connected to the piston-wheel and advance forward to allow the revolving piston to take its place, at the same time to admit steam, air, gas, and other fluids by the inlet-valve R² quick enough to neutralize the momentum of the revolving piston while being brought to a rest to act as a partiton and also to give the necessary lead for giving motion to the piston just commencing its revolution.

What I claim as my invention, and desire to secure by Letters Patent, is—

1. The combination, in a rotary engine having a cylindrical casing with an annular cavity or space of circular or other form and conical faces formed upon the inside of the casing, of the spring-rings between said faces, the piston-wheel with recesses formed in its periphery and fitted upon a shaft between the spring-rings, the pistons of circular or other form, with sliding bolts, bars, levers, springs, and connecting-rods fitted within the pistons for connecting and disconnecting to and from the piston-wheel and casing, respectively, and used as pistons and partitions alternately, the releasing-levers, shaft, and cam-rod for connecting and disconnecting the pistons to and from the piston-wheel, the shaft, cam, and wheels for actuating the releasing-levers and valve-gear, and the reversing or expansion and inlet valves, with their ports, for controlling the admission and release of steam, air, gas, and other fluids to and from the annular cavity of a simple non-reversing rotary-engine casing, substantially as described.

2. The combination, in a rotary engine having a cylindrical casing with an annular cavity or space of circular or other form and removable cover and conical faces formed upon the inside of the casing, of the spring-rings between said faces, the piston-wheel with recesses formed in its periphery and fitted upon a shaft between the spring-rings, the pistons of circular or other form with sliding bolts, bars, levers, springs, and connecting-rods fitted within the pistons for connecting and disconnecting to and from the piston-wheel and casing, respectively, and used as pistons and partitions alternately, the releasing-levers, shaft, and cam-rod for connecting and disconnecting the pistons to and from the piston-wheel, the shaft, cam, and wheels for actuating the releasing-levers and valve-gear, and the reversing or expansion and inlet valves, with their ports, for controlling the admission and release and also altering the direction of the steam, air, gas, and other fluids to and from the annular cavity of a reversing rotary-engine casing, substantially as described.

3. The combination, in a rotary engine having a cylindrical casing with an annular cavity or space of circular or other form and removable cover and conical faces formed upon the inside of the casing, of the spring-rings between said faces, the piston-wheel with recesses formed in its periphery, forged solid upon the shaft, and fitted between the spring-rings, the pistons of circular or other form, with sliding bolts, bars, levers, springs, and connecting-rods fitted within the pistons for connecting and disconnecting to and from the piston-wheel and casing, respectively, and used as pistons and partitions alternately, the releasing-levers, shaft, and cam-rod for connecting and disconnecting the pistons to and from the piston-wheel, the shaft, cam, and wheels for actuating the releasing-levers and valve-gear, and the reversing or expansion and inlet valves, with their ports, for controlling the admission and release of steam, air, gas, and other fluids to and from the annular cavity of compound or other expansion and condensing rotary-engine casings, substantially as described.

4. The combination, in a rotary engine having a cylindrical casing with an annular cavity or space of circular or other form, of a steel lining fitted within annular cavity, leaving a space between the lining and casing for a water-jacket, and conical faces formed upon the steel lining, the spring-rings between said faces, the piston-wheel with recesses formed in its periphery, forged solid upon the shaft, with a hole formed through the center of the shaft for water-service, and fitted between the spring-rings, the pistons of circular or other form, with sliding bolts, bars, levers, springs, and connecting-rods fitted within the pistons for connecting and disconnecting to and from the piston-wheel and casing, respectively, and used as pistons and partitions alternately, the releasing-levers, shaft, and cam-rod for connecting and disconnecting the pistons to and from the piston-wheel, the shaft, cam, and wheels for actuating the releasing-levers and valve-gear, and the reversing or expansion and inlet valves, with their ports, for controlling the admission and release of air and gas to and from the annular cavity of a rotary-gas-engine casing, substantially as described.

5. The combination, in a rotary engine having a cylindrical casing with an annular cavity or space of circular or other form, of a steel lining fitted within annular cavity, leaving a space between the lining and casing for a steam-jacket, and conical faces formed upon the steel lining, the spring-rings between said faces, the piston-wheel with recesses formed in its periphery, forged solid upon the shaft, with a hole formed through the center of the shaft for water-service, and fitted between the spring-rings, the pistons of circular or other form, with sliding bolts, bars, levers, springs, and connecting-rods fitted within the pistons for connecting and disconnecting to and from the piston-wheel and casing, respectively, and used as pistons and partitions alternately, the releasing-levers, shaft, and cam-rod for connecting and disconnecting the pistons to and from the piston-wheel, the shaft, cam, and wheels for actuating the releasing-levers and valve-gear, and the reversing or expansion and inlet valves, with their ports, for controlling the admission and release of steam, air, gas, and other fluids to and from the annular cavity of a high-speed rotary-engine casing, substantially as described.

JEFFREY SNELLING.

Witnesses:
ALBERT READ,
FREDERICK PECK.